US012734698B2

(12) United States Patent
Wild et al.

(10) Patent No.: US 12,734,698 B2
(45) Date of Patent: Sep. 15, 2026

(54) ROBOT ARM MODELLING

(71) Applicant: ROLLS-ROYCE plc, London (GB)

(72) Inventors: Samuel P Wild, Derby (GB); Xin Dong, Derby (GB); Andrew D Norton, Derby (GB)

(73) Assignee: ROLLS-ROYCE plc, London (GB)

( * ) Notice: Subject to any disclaimer, the term of this patent is extended or adjusted under 35 U.S.C. 154(b) by 25 days.

(21) Appl. No.: 18/950,934

(22) Filed: Nov. 18, 2024

(65) Prior Publication Data

US 2025/0196359 A1 Jun. 19, 2025

(30) Foreign Application Priority Data

Dec. 15, 2023 (GB) .................................... 2319254

(51) Int. Cl.
*B25J 13/08* (2006.01)
*B25J 9/06* (2006.01)
*B25J 9/16* (2006.01)

(52) U.S. Cl.
CPC ............ *B25J 9/1692* (2013.01); *B25J 9/065* (2013.01); *B25J 9/1635* (2013.01); *B25J 9/1664* (2013.01); *B25J 13/08* (2013.01)

(58) Field of Classification Search
CPC ........ B25J 9/1692; B25J 9/065; B25J 9/1635; B25J 9/1664; B25J 13/08; B25J 9/1697; G05B 2219/37288; G05B 2219/37571; G05B 2219/39064; G05B 2219/39071; G05B 2219/40234
See application file for complete search history.

(56) References Cited

U.S. PATENT DOCUMENTS 11,912,513 B1 * 2/2024 Polido .................... B25J 9/1697
2015/0192743 A1 7/2015 Rogers et al.
2015/0209117 A1 7/2015 Flexman et al.
2019/0390985 A1 12/2019 Kwok et al.
2020/0338723 A1 10/2020 Sefati et al.
2021/0023719 A1 * 1/2021 Alt ......................... B25J 9/1697
2022/0047341 A1 * 2/2022 Larkin .................. A61B 1/009

OTHER PUBLICATIONS

Ha et al., Shape Sensing of Flexible Robots Based on Deep Learning, 2023, IEEE Transactions of Robotics (Year: 2023).*

(Continued)

*Primary Examiner* — Adam R Mott
*Assistant Examiner* — Heather J Keniry
(74) *Attorney, Agent, or Firm* — Oliff PLC

(57) ABSTRACT

A method of determining the position and shape of a flexible arm robot having at least one distributed Bragg reflector integrated, the method comprising: moving the flexible arm robot through a series of movements; tracking the movements of the flexible arm robot and recording positional data of at least a section of the flexible arm robot as a ground truth and interrogating the distributed Bragg reflector during these movements; inputting the data from the interrogation of the distributed Bragg reflector and the camera into a machine learning algorithm; using the output of the machine learning algorithm to determine a calibration function for the position of the distributed Bragg reflector within the flexible arm robot; and applying the calibration function to software used to control the movement of the flexible arm robot.

11 Claims, 6 Drawing Sheets

(56) References Cited

OTHER PUBLICATIONS

Xuan Thao Ha et al., "Shape Sensing of Flexible Robots Based on Deep Learning", IEEE Transactions on Robotics, 2023, vol. 39, No. 2.

Sefati et al., "Data-Driven Shape Sensing of a Surgical Continuum Manipulator Using an Uncalibrated Fiber Bragg Grating Sensors", IEEE Sensor Journal, 2020, vol. 21, No. 3.

Alambeigi et al., "SCADE: Simultaneous Sensor Calibration and Deformation Estimation of FBG-Equipped Unmolded Continuum Manipulators", IEEE Transactions on Robotics, 2020, vol. 36, No. 1.

* cited by examiner

ROBOT ARM MODELLING

CROSS-REFERENCE TO RELATED APPLICATIONS

This specification is based upon and claims the benefit of priority from United Kingdom patent application number GB 2319254.5 filed on Dec. 15, 2023, the entire contents of which is incorporated herein by reference.

BACKGROUND

1. Field of the Disclosure

The disclosure relates to the integration distributed Bragg reflectors into flexible arm robots, such as borescopes, continuum arm or hyper-redundant robot. The disclosure also relates to method for modelling the positioning of the flexible robot arm.

2. Description of the Related Art

Flexible robotic arm systems such as continuum arm robots, borescopes, snake arm robots and endoscopes are used in a number of areas of industry from repair of complex equipment to performing medical operations. The reason that they are used is because of their controllable flexibility, which allows them to safely access spaces that would be inaccessible without much more extensive work. Flexible robotic arms can be used for both inspection and repair processes, with the nature of the probe being determined by the tool or camera system that is used as the end effector on the robot. With these benefits the uses for flexible robotic arms are going to have a greater number of applications.

Despite the number of applications there are still issues with the use of flexible arm robots. Many of the issues are also related to their advantage in the that the flexibility means that their positional control is not very accurate; this means that the robot cannot easily be controlled automatically. As such, the systems require complex systems in place to determine the position and shape of the robot such that a task can be performed. Due to the difficulty in knowing the exact shape of the robot within the workplace it is difficult to determine the length of the robotic arm to be inserted into the workspace. Therefore, it is important to develop systems that can allow the shape of the robotic arm to be determined.

SUMMARY

The scope of the disclosure is set out in the appended claims.

According to a first aspect of the disclosure there is provided a method for determining the position and shape of a flexible arm robot having at least one distributed Bragg reflector integrated, the method comprising: tracking the movements of a the flexible arm robot using at least one sensor and recording positional data of at least a section of the flexible arm robot as a ground truth as the flexible robotic arm undergoes a series of movements and interrogating the distributed Bragg reflector during these movements; inputting the data from the interrogation of the distributed Bragg reflector and the at least one sensor into a machine learning algorithm; using the output of the machine learning algorithm to determine a calibration function for the position of the distributed Bragg reflector within the flexible arm robot; and applying the calibration function to software used to control the movement of the flexible arm robot.

The tracking step may comprise using at least two sensors to track the movements of the flexible arm robot, wherein the flexible arm robot is provided with at least two tracking markers The sensors may be angularly and spatially distanced from each other.

More than two tracking markers may be positioned on the flexible arm robot.

At least one tracking marker may be positioned on every joint of the flexible arm robot.

The movements that are tracked may be a series of movements input by an operator.

The movements that are tracked may be a pre-programmed series of movements programmed into the software used to control the flexible arm robot.

The machine learning algorithm may be a neural network or a non-linear regression model.

The machine learning algorithm may be configured to optimise and match the sensor tracked backbone curve by performing a local/global optimisation algorithm that rotates the sensing fibre backbone curve in the X, Y and Z-plane across 360 degrees to find the closest match to the sensor measured curve.

The optimisation is performed by minimising the root mean square error (RMSE) between the two curves or multiple positions.

The inputting of the data into the machine learning algorithm may be done once the movement control programs have been completed.

The inputting of the data into the machine learning algorithm may be done live as the movements performed.

According to a second aspect of the disclosure there is provided a system for accurately determining the shape of a flexible arm robot, the system comprising: a flexible arm robot having a distributed Bragg reflector integrated into the arm, with the flexible robotic arm being coupled to an actuator pack, which in turn is connected to a computer with software for controlling the robot, and the distributed Bragg reflector being connected to an interrogator measuring the change in Bragg wavelength as the robot bends, and wherein the flexible arm robot has at least two tracking markers positioned on an outside surface thereof; at least one sensor used to record the movement and deformation of the flexible arm robot, and a computer system connected to the interrogator and the at least one sensor, the computer system having a machine learning system loaded onto the computer system, the machine learning software being used to determine a calibration function for the position of the distributed Bragg reflector.

Tracking markers may be positioned at regular spatial and angular positions on the flexible arm robot.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Aspects and embodiments of the present disclosure will now be discussed with reference to the accompanying figures. Further aspects and embodiments will be apparent to those skilled in the art.

Figure 1:
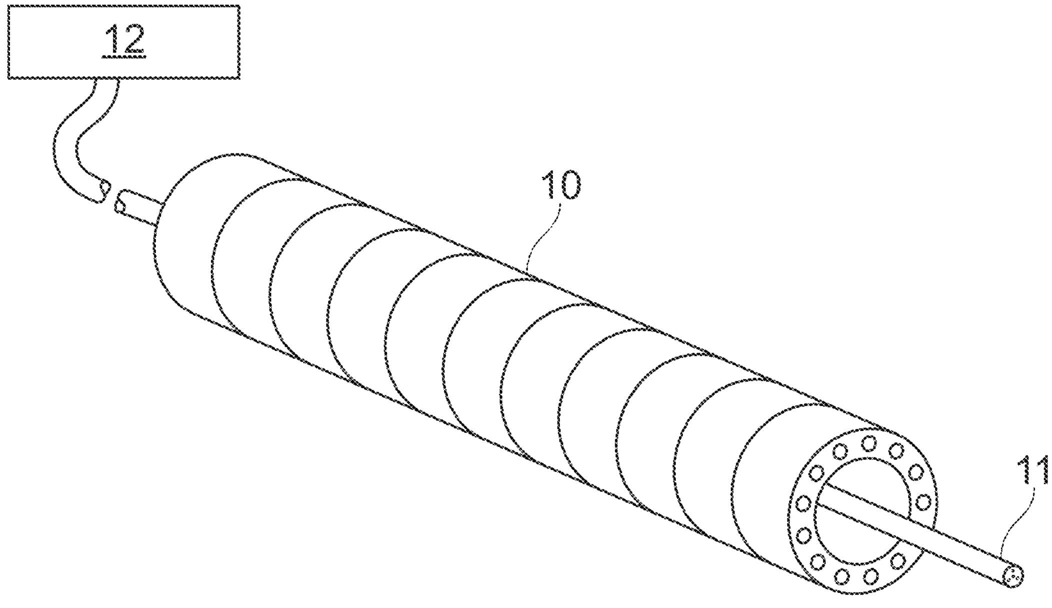
FIG. 1 presents an example of a continuum arm robot having an optical fibre running through the core of the continuum arm.

FIG. 1 presents an example of a continuum arm robot 10 having an optical fibre 11 running through the core of the continuum arm. The optical fibre 11 may be a bundle of optical fibres; they may be single or multiple core fibres. The optical fibre has at least a fibre Bragg grating (FBG) positioned at a joint within the robot arm. If a bundle of fibres has been used a FBG may be present at point corresponding to joint positions. A Fibre Bragg grating is a length of optical fibre that has a distributed Bragg reflector constructed within a short segment of it. The Bragg reflector allows certain wavelengths to pass and others to be reflected. FBG shape sensors are optical fibres that can measure an object's shape based on the strain and curvature of each grating. FBG optical fibres can be single, multicore or multiple core fibres. As light passes through the optical fibre, it is reflected at each grating at a specific wavelength called the Bragg wavelength. The shift in the Bragg wavelength can be used to calculate the curvature of the joint. The information for different joints can be combined for a series of joint curvatures to determine the overall shape of the robotic arm. The robotic arm is connected to an interrogator 12 to monitor the change in wavelength that has been transmitted along the optical fibres. By monitoring the changes and the transmission of light along the optical fibres the curvature of the joint can be determined. In the figure, the first FBG is positioned at the first joint of the continuum robot. FBGs may be present at each joint, or alternatively they may be positioned at regular intervals at joints along the continuum arm robot. The FBG fibre should be positioned within the arm, so that it does not unduly twist outside of the motion and twist of the robotic arm. The interrogator 12 can be connected to a computer, or may have a computer system contained within it. The computer system can use the data from the changes in the spectral information to determine changes in shapes of the fibres resulting from deformation of the robotic arm. Consequently, from this, the data can be used to determine the shape of the continuum arm robot. Such systems can provide an idea of the shape of a continuum arm robot. However, on its own, such a determination can only provide a guidance for the position and not an accurate determination. This is because any twist within the fibre will affect the results as this can affect the spectra that is transmitted within a fibre in the same way as a bend does. Therefore, this can produce an incorrect value for the determination of the shape. The twist may be due to bending of the robotic arm. Alternatively, it may be present at construction of the robotic arm.

Figure 2:
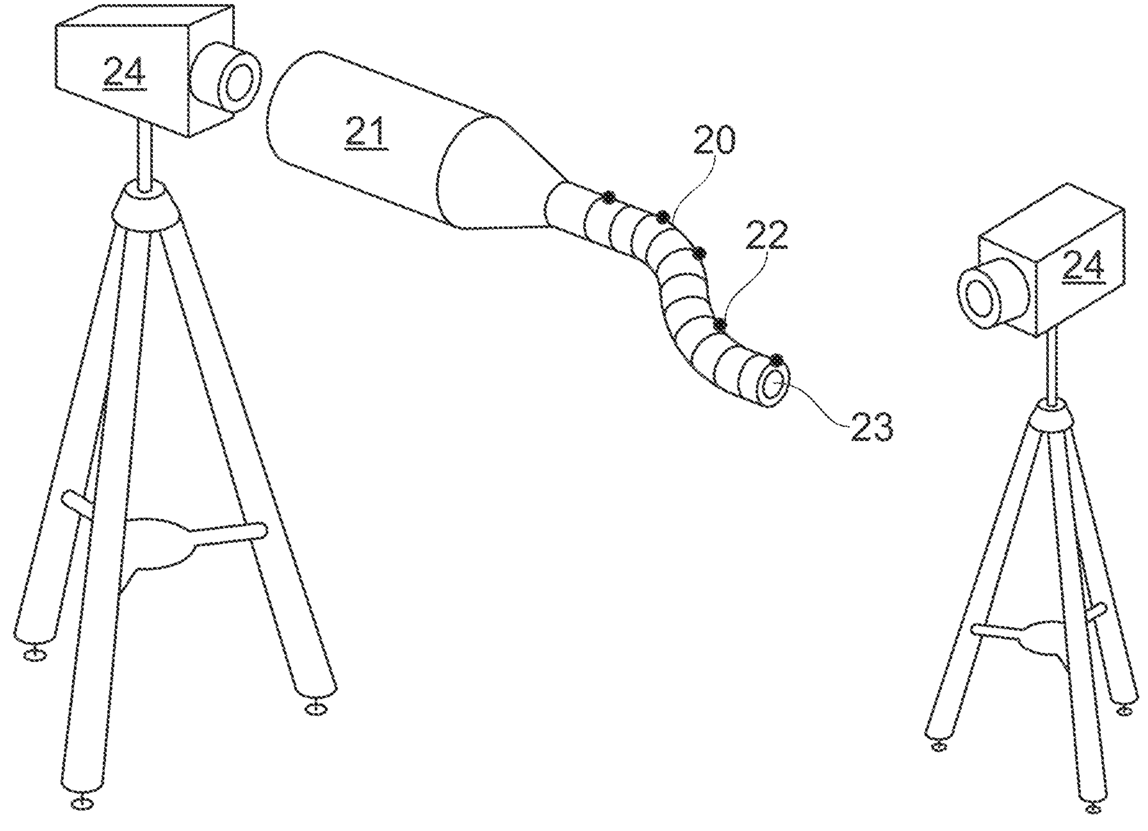
FIG. 2 presents a system for accurately monitoring the shape of a continuum robot.

FIG. 2 presents a system for accurately monitoring the shape of a continuum robot. The system comprises the continuum robot arm 20 having an associated actuator pack 21 for controlling the deformation of the continuum arm robot. The continuum arm robot may be of any suitable length, that is both with regards to the length of segments or joints and their number. The robotic arm has a number of optical markers 22 placed at intervals, in length and/or position about the robotic arm. The robotic arm is shown having the FBG optical fibres 23 running through the core of the robot. Positioned about the robot are two tracking camera systems 24 for monitoring the position of the robot arm and using the optical markers to and the relative position and orientation between them to determine the shape of the robot. The cameras systems 24 are mounted about the robot, so that they are able to capture full motion and movement of the robotic arm. In this, a camera system tracks the movement of the continuum robot through 3D space. This is akin to what is used for CGI mapping of movement. The camera system provides the correct position, scale, orientation, and motion relative to the photographed objects in the shot. Due to its high accuracy of the measurement of the robot arm shape and position, the feed this is deemed ground truth. The reflective optical markers on the continuum robot such that the camera system tracks the continuum robot backbone. The position and orientation of the reflective optical markers that are present on the continuum robot are used as an input to model the continuum robot backbone as a curve. The greater the number of cameras used and the more angles that are filmed/photographed the more accurate the modelling of the continuum arm robot is. Although this is presented as a having two cameras a single camera having a stereoscopic lens may be used. Furthermore, although this example is presented as an optical interrogation system to determine the ground truth, other ways of capturing the ground truth may also be employed. For example, this could include the use of a plurality of inertial measurement units. Alternatively, it may utilise motion capture systems that do not use optical markers. For example, this could be radar, or lidar systems or magnetometers. Furthermore, the shape and positional co-ordinates could be determined along the robot arm by an operator.

The modelling of the robot is performed by running a series of movements of the continuum robot. These can be user operated random movements, or a planned movement sequence. Alternatively, it could be a computer programmed into the flexible arm control software to provide a series of movements to determine the shape and the position of the continuum robot arm. The input of the reflective markers is tracked by the camera system and used to monitor the position and shape of the continuum robot. With the distance between the markers and their relative position to the camera also known, the data from each frame can be added into the modelling. Thus, the image data can be used to build up an accurate three-dimensional model of the movement of the robot in a motion capture frame. Increasing the number of reflective optical markers on the robot increases the accuracy of the plotting; this is because it can track the change in angle and the relative position between the markers to produce an accurate plot. In modelling the robot there must be at least one marker at the proximal end, the middle and the distal end of the active part of the continuum robot. Preferably, there would be at least one marker positioned on every joint or segment within the body of the continuum arm robot.

The data of the ground truth from the optical tracking can be combined with the data from the interrogator of the FBG optical fibre that runs through the arm. The data for both needs to be taken during the camera scanning run, so that they are comparable. The data can be later combined or can be combined during the camera measuring process. Utilising the camera data it is possible to compensate for any twist and other factors within the FBG optical fibres, so that the exact position and shape of the continuum arm is known rather than an estimate. The other factors that may affect the FBG sensing are fibre quality, friction, normal forces long the fibre, high bending scenarios and the quality of the light source. This is beneficial in delicate areas of operation, or where automatic computer control is used to move the robot arm.

Figure 3:
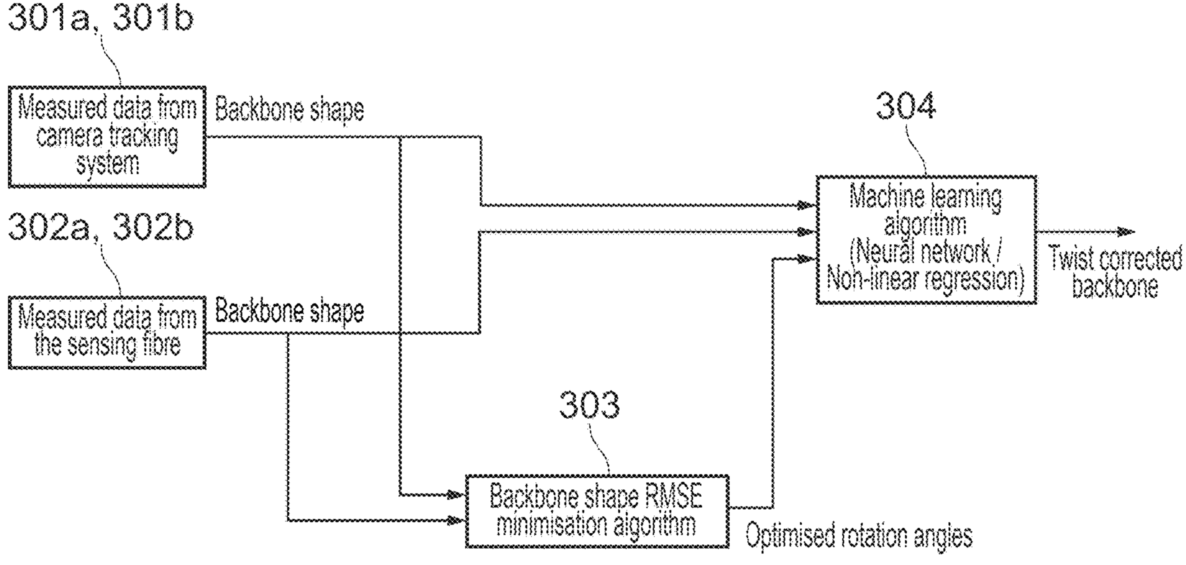
FIG. 3 presents a machine learning approach of positional determination and FBG twist compensation.

FIG. 3 presents a machine learning approach of positional determination and FBG twist compensation. In step 301*a*, tracking data is fed into a machine learning algorithm 304. The tracking data may be from the camera system as shown in FIG. 2. In step 302*a*, along with the data from the interrogator on the FBG sensors is fed into the machine learning algorithm 304. In addition, the data from the camera system (step 301*b*) and the data from the interrogator for the FBG (302*b*) is fed into a shape root mean square minimisation algorithm (RMSE) 303. The output from this is fed into computer system using computational learning techniques 304. For example, this may be a machine learning algorithm. The machine learning algorithm may be a neural network or a non-linear regression model. The model is predominantly used because of the effects of twist and other factors along the sensing fibre, which means that the interpretation of backbone shape according to the interrogator data is misaligned relative to the ground truth as determined by the camera. Inputting both data sets into the machine learning algorithm compensates for this. The machine learning algorithm may be configured to optimise and match the camera tracked backbone curve by performing a local/global optimisation algorithm that rotates the sensing fibre backbone curve in the X, Y and Z-plane across 360 degrees to find the closest match to the camera measured curve. Alternatively, it may be configured to minimise the RMSE between aligned successive optical markers and FBG gratings. In both cases, this is done by minimising the root mean square error (RMSE) between the two curves or multiple positions. Upon this, the convergence angles in X, Y and Z-plane represent the twist along the fibre at different CR position and orientations within a three-dimensional spatial environment. By scaling of the number of markers along the backbone provides more data that can be entered into the algorithm for training. Additionally or alternatively, by moving the continuum arm along different path profiles provides a larger and more accurate set of training data. As can be followed, the greater the amount of training data that is added into the model the more accurate the determination of shape and position of the robot is. The fibre measured backbone and rotation angles in X, Y and Z planes as well as the ground truth are used as input variables to a neural network or other machine learning approach. The neural network or machine learning system may work in real-time, and as such may utilise non-linear regression. The machine learning algorithm learns to match the output shape of the sensing fibre to the output of the camera tracked shape based upon the rotation angles measured to minimise the shape RMSE.

The training data used in the machine learning algorithm represents a real world representation of the continuum robot's shape and the shape sensed by the FBG shape sensor. The training data can be split up into training, testing and validation sets of data (These sets of data follow their definition in machine learning). The machine learning algorithm uses the training data to make predictions of the behaviour of the FBG shape sensor, when the continuum robot is in different shapes.

Figure 4A:
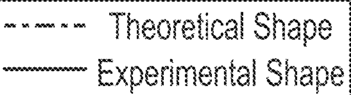
FIG. 4A presents an example of the comparison of the raw positional data of a continuum arm robot comparing the ground truth against the data from the interrogator for the FBG fibre.
Figure 4A:
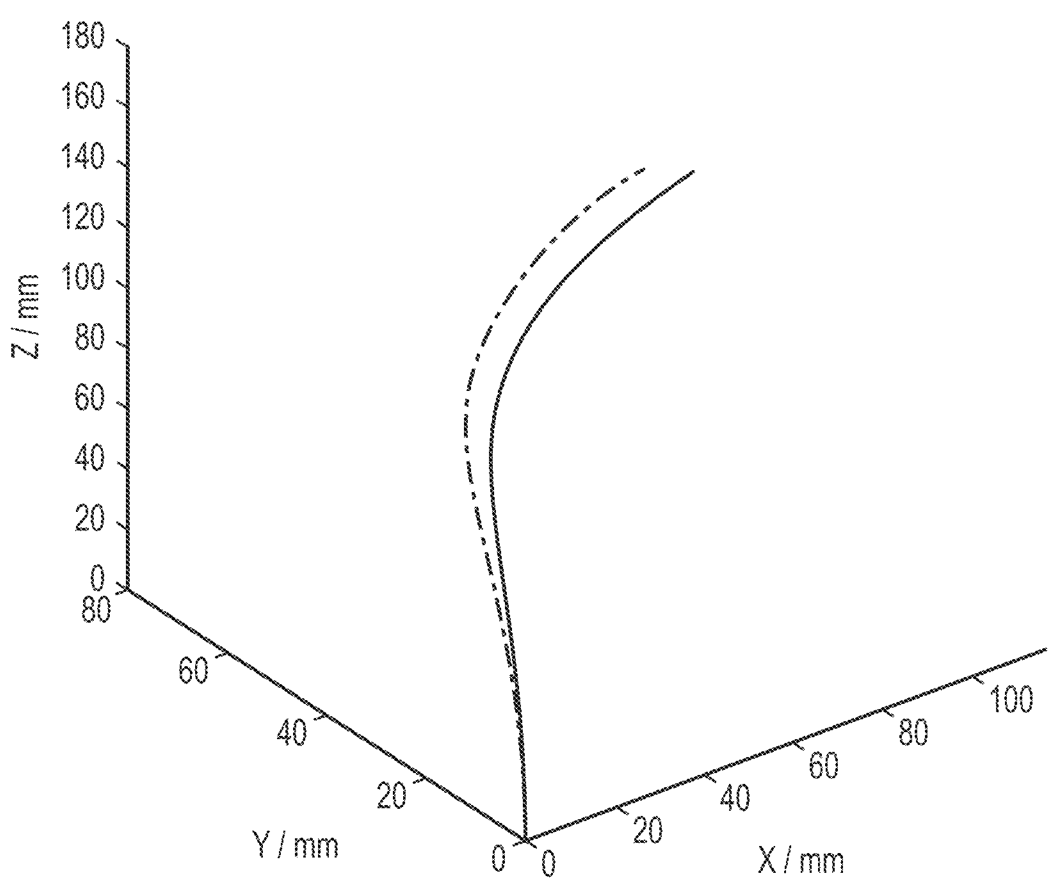
Figure 4B:
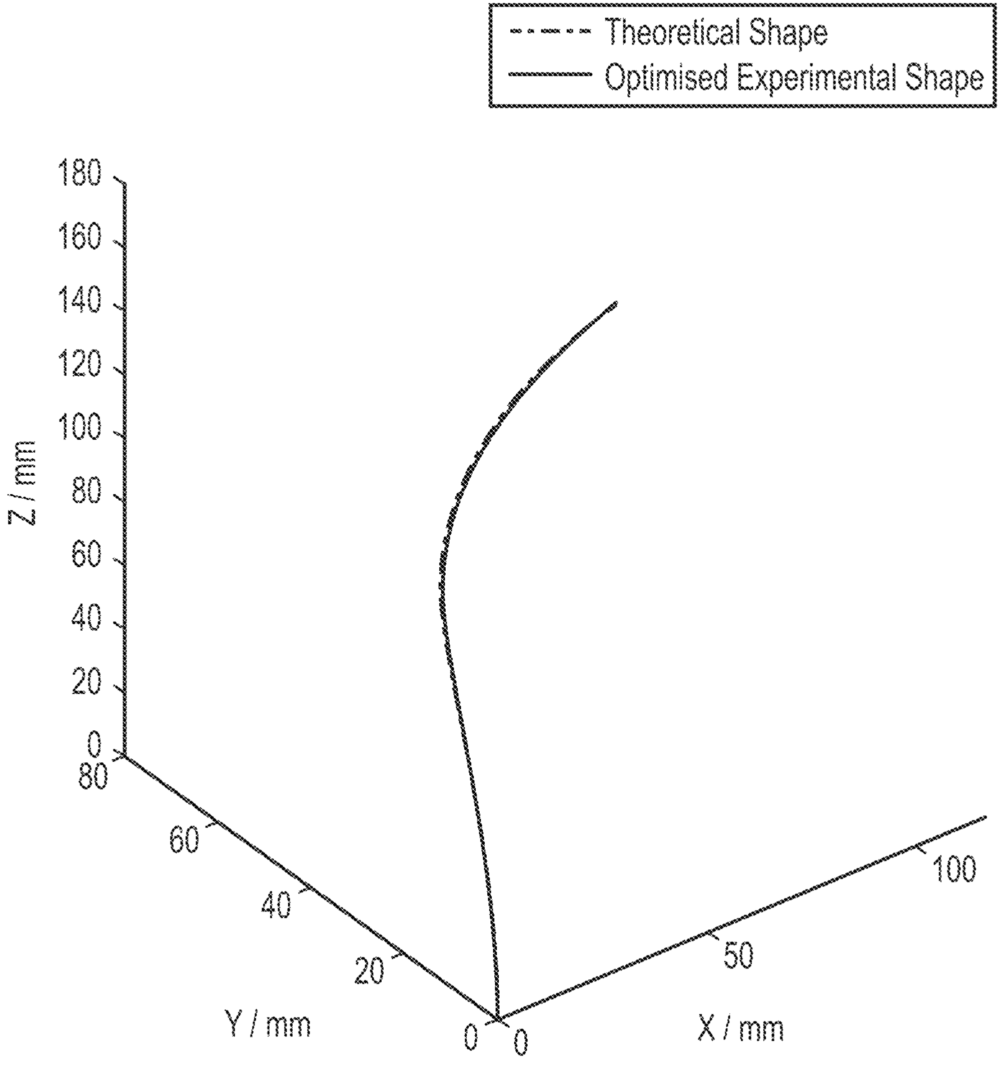
FIG. 4B presents the calculated data against the measured ground truth after compensation/calibration by the machine learning algorithm.

FIG. 4A presents an example of the comparison of the raw positional data of a continuum arm robot comparing the ground truth against the data from the interrogator for the FBG fibre. The graph shows that at the distal end of the continuum arm robot the match between the positional data and the camera data is the same, as this is set at zero. As the distance along the continuum arm from the distal end increases, so does the difference between the calculated position from the FBG readings and the camera determined ground truth. At the proximal end the difference between the ground truth and the calculated position is around 10 mm, which is around a 6% error in position. Such an error could result in damage to the working area, as the robot arm comes into contact with a pipe; this could lead weaken the pipe or result in debris being left in the area. Additionally or alternatively, if the robot arm is used for inspection it may mean that the camera is incorrectly positioned relative to the component to be imaged, resulting in more time being required to correct this, or in the case of a repair that the wrong area of a component is being repaired. FIG. 4B presents the calculated data against the measured ground truth after compensation/calibration by the machine learning algorithm. As can be seen the data tracks nearly identically along the entire length of the continuum robot. With this calibration the robotic arm does not suffer the same issues as the uncompensated data. As such, the compensated robotic arm could be controlled automatically through a computer program and the position and the shape of the robotic arm could follow a desired path and shape. Additionally or alternatively, this will mean that the position of the end effector is known, so that imaging or repairs can be performed reliably and accurately, reducing working time.

Figure 5:
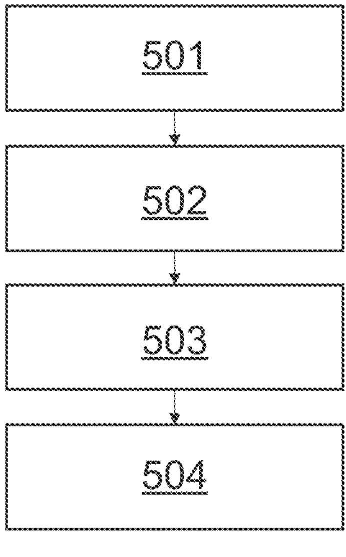
FIG. 5 presents a workflow diagram for the calibration of the robot arm having FBG fibres.

A workflow diagram is shown in FIG. 5 for the calibration of the robot arm having FBG fibres. Optical markers may be added to the robot, or may be included during the build of the arm. Optical markers need to be positioned at least at the proximal end, the distal end and the middle. Preferably, the robotic arm features at least one optical marker on each joint or segment of the robot. The greater the number of optical markers the greater the amount of training data that can be used to model the different points of the robot arm. This results in more accurate modelling of the entire shape of the robot and an improved calibration for any twist that is present within the system. The robot arm is positioned with at least one camera to capture the motion. Preferably there is more than one camera present to capture the motion of the robot. If there are two or more cameras, they may be angularly spaced to obtain an increased data for the modelling and provides more accurate spatial tracking of the robotic arm. In step 501 the robotic arm undergoes a series of movements, whilst being tracked and the FBG data being recorded. The series of movements may be a series of planned movements, or random movements executed by an operator, or may be a pre-programmed or pseudorandom movements performed by an automated controller of the robotic arm. In step 502 the data from the camera tracking and the FBG are fed into the Machine learning algorithm, as well as into the RSME algorithm for feeding into the Machine learning algorithm. As discussed above, this combines the data points to determine a compensation factor for each length, joint or segment of the continuum robot. In this case a length, may be a number of joints or segments that are linked. The data may be fed into the machine learning algorithm in real time, or may be input after the step 501 has been completed. In step 503, the system determines a calibration function. This calibration function may be provided for each joint, segment or length of the arm that has been modelled. In step 504, the calibration function is applied to the control software, which takes the readout from the FBG interrogator. Once the calibration data has been added the robotic arm is then able to be used accurately separate from the recording system. The calibration allows for an accurate determination of the shape of the robot; this improves the usability of the robotic arm. The calibration process as set out in steps 501-504 may be repeated at intervals to the arm to ensure an accurate calibration is always present.

In a system employing automatic control, the FBG data from the interrogator may be fed back into the system as part of a feedback control. With the calibration any effects of twist can be compensated for, such that the automatic controller is able to accurately able to calculate the shape and position of the current state of the robot arm. From this any further or subsequent movement control signals can be accurately determined and compensated for as the series of movements are performed. This allows for a more accurate real time determination of the position of the robot than that provided from the FBG signal alone. Also, it allows for accurate determination of the tip position relative to the distal end of the robotic arm. This is beneficial in accurately utilising the end effector for an operation, such as a repair process or an imaging process.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of determining a position and a shape of a flexible arm robot having at least one tracking marker and having at least one distributed Bragg reflector integrated into the arm, the method comprising:

moving the flexible arm robot through a series of movements;

tracking the movements of the flexible arm robot using at least two sensors and recording positional data of at least a section of the flexible arm robot as a ground truth and interrogating the distributed Bragg reflector during the series of movements;

inputting the data from the interrogation of the distributed Bragg reflector and the at least two sensors into a machine learning algorithm;

using an output of the machine learning algorithm to determine a calibration function for the position of the distributed Bragg reflector within the flexible arm robot; and applying the calibration function to software used to control the movement of the flexible arm robot;

wherein the at least two sensors are angularly and spatially distanced from each other, and wherein the machine learning algorithm is configured to optimize and match a sensor tracked backbone curve by performing a local/global optimization algorithm that rotates a sensing fiber backbone curve in X, Y, and Z-planes across 360 degrees to find a closest match to a sensor measured curve.

2. The method according to claim 1, wherein at least two tracking markers are positioned on the flexible arm.

3. The method according to claim 2, wherein at least one tracking marker is positioned on every joint of the flexible arm.

4. The method according to claim 1, wherein the movements that are tracked are a series of movements input by an operator.

5. The method according to claim 1, wherein the movements are a pre-programmed series of movements programmed into the software used to control the flexible arm.

6. The method according to claim 1, wherein the machine learning algorithm is a neural network or a non-linear regression model.

7. The method according to claim 1, wherein the optimization is performed by minimizing a root mean square error (RMSE) between two curves.

8. The method according to claim 1, wherein the inputting of the data into the machine learning algorithm is done after movement control programs have been completed.

9. The method according to claim 1, wherein the inputting of the data into the machine learning algorithm is done live as the movements are performed.

10. A system for accurately determining a shape of a flexible arm robot, the system comprising:

a flexible arm robot having a distributed Bragg reflector integrated into the arm, with the flexible robotic arm being coupled to an actuator pack, which in turn is connected to a computer system with software for controlling the robot, and the distributed Bragg reflector being connected to an interrogator measuring a change in Bragg wavelength as the flexible arm robot bends, and wherein the flexible arm robot has at least two tracking markers positioned on an outside surface thereof;

at least two sensors used to track and record a movement and deformation of the flexible arm robot, and the computer system is connected to the interrogator and the at least two sensors, the computer system having a machine learning algorithm loaded onto the computer system, the machine learning algorithm being used to determine a calibration function for the position of the distributed Bragg reflector;

wherein the at least two sensors are angularly and spatially distanced from each other, and wherein the machine learning algorithm is configured to optimize and match a sensor tracked backbone curve by performing a local/global optimization algorithm that rotates a sensing fiber backbone curve in X, Y, and Z-planes across 360 degrees to find a closest match to a sensor measured curve.

11. The system according to claim 10, wherein the at least two tracking markers are positioned at regular spatial and angular positions on the flexible arm robot.

* * * * *